(No Model.) 9 Sheets—Sheet 2.

W. A. KILMER.
FENCE MACHINE.

No. 595,392. Patented Dec. 14, 1897.

WITNESSES
F. L. Ourand
J. H. Kester

INVENTOR
William A. Kilmer
per W. H. Singleton
Attorney

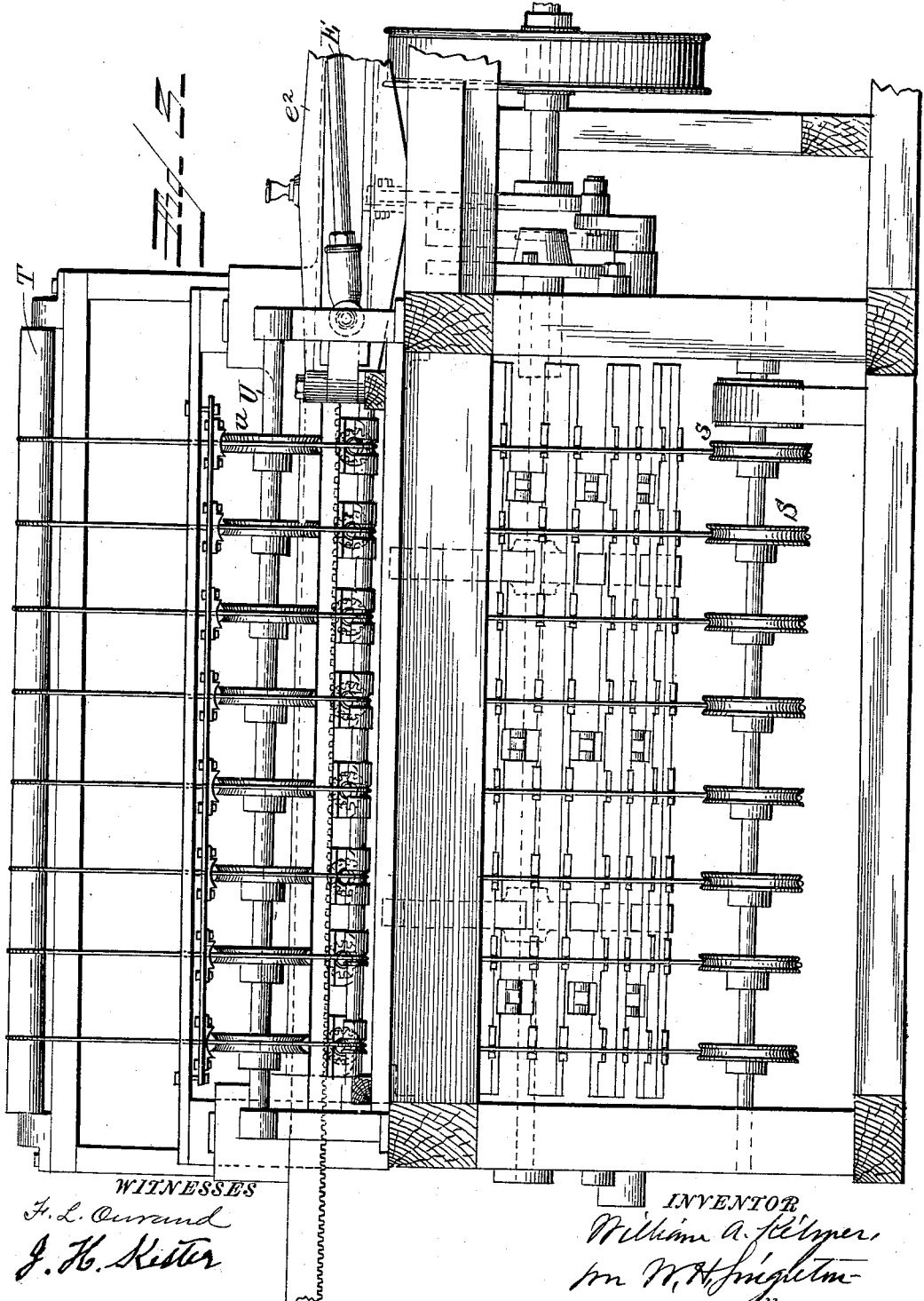

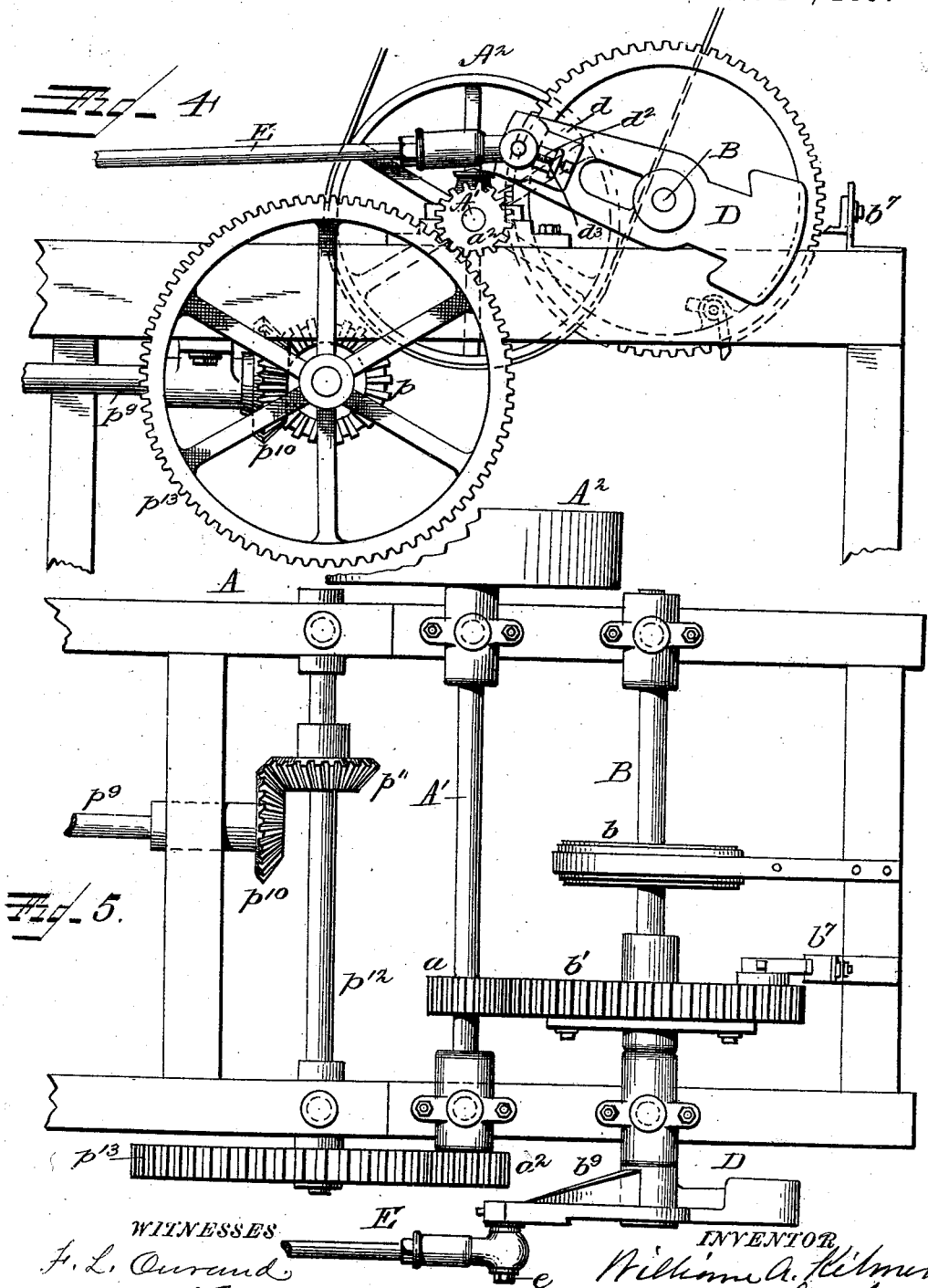

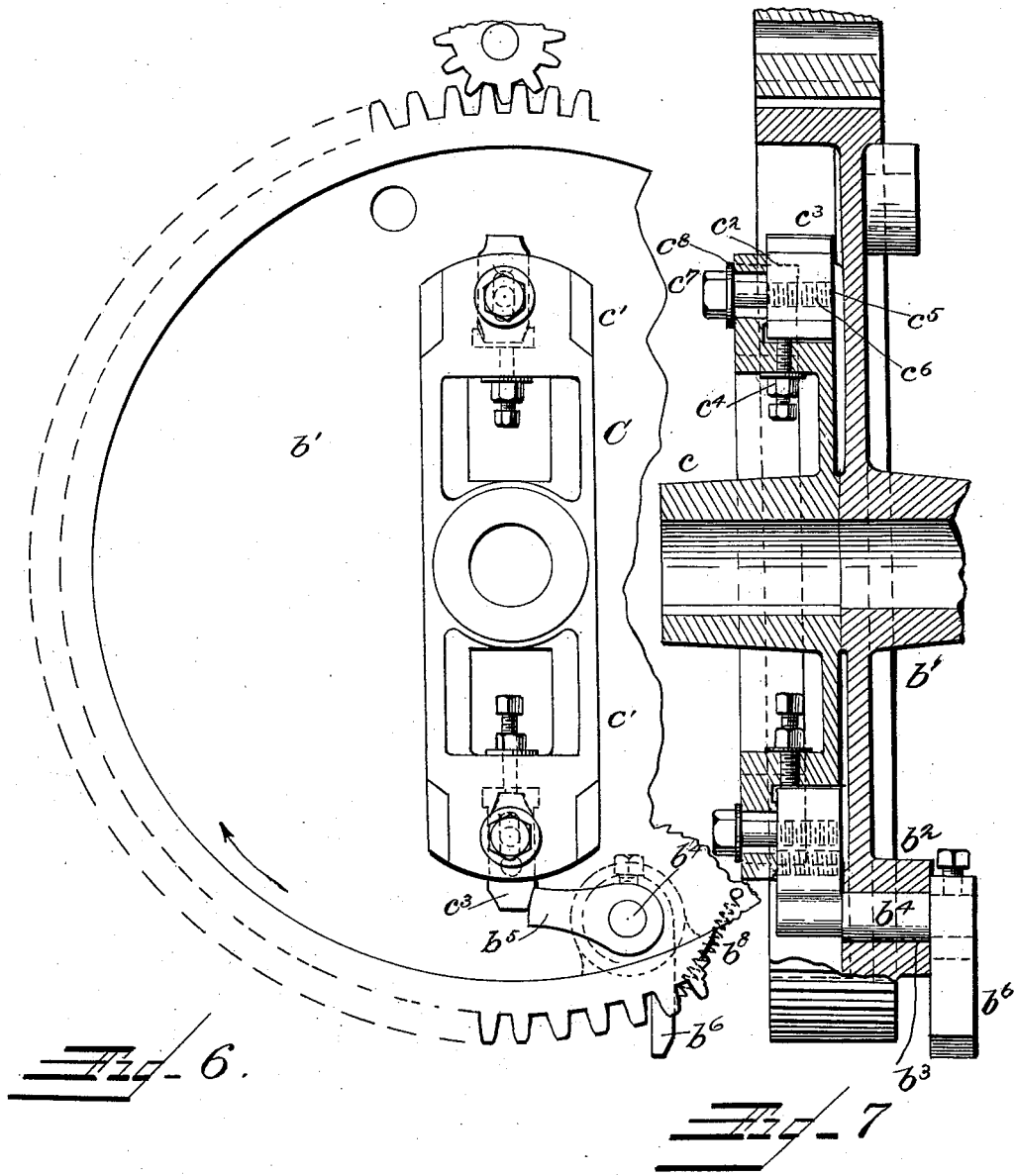

(No Model.) 9 Sheets—Sheet 6.
W. A. KILMER.
FENCE MACHINE.
No. 595,392. Patented Dec. 14, 1897.
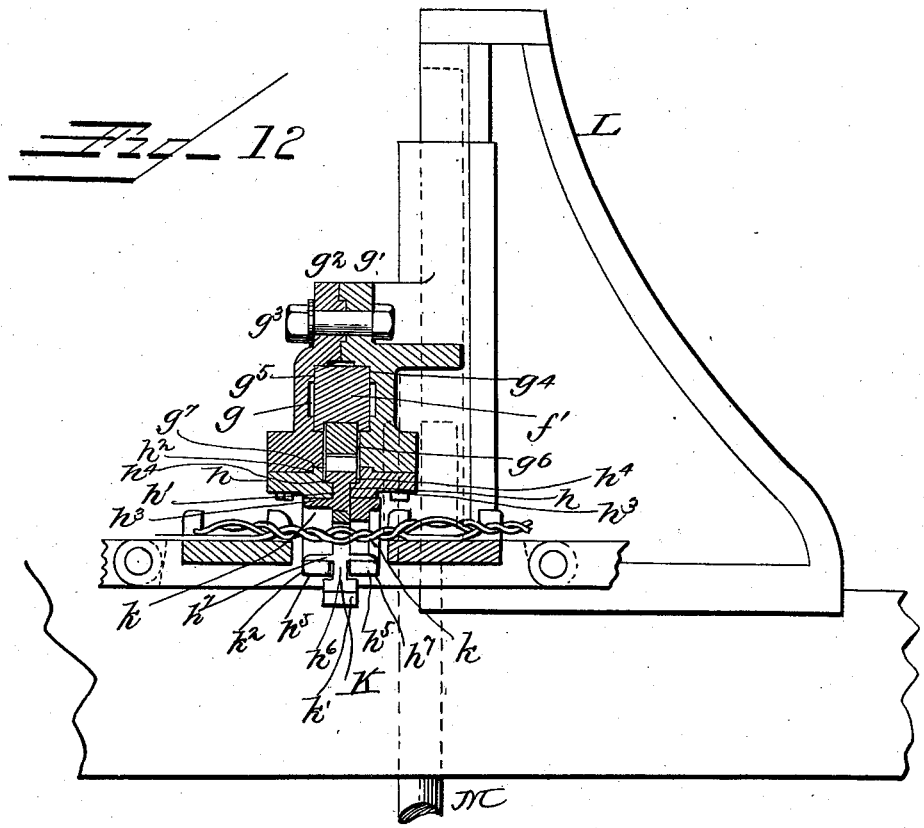
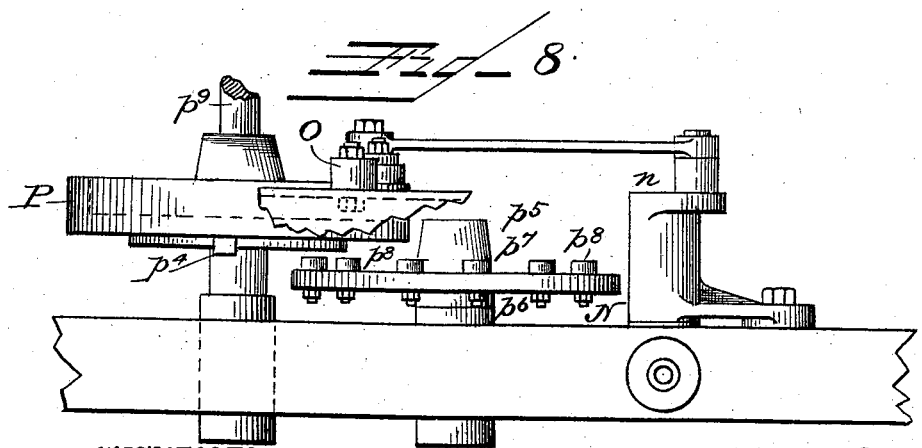
WITNESSES
F. L. Durand
J. H. Kester
INVENTOR
William A. Kilmer
per W. H. Singleton
Attorney (No Model.)
9 Sheets—Sheet 7.
W. A. KILMER.
FENCE MACHINE.
No. 595,392.
Patented Dec. 14, 1897.
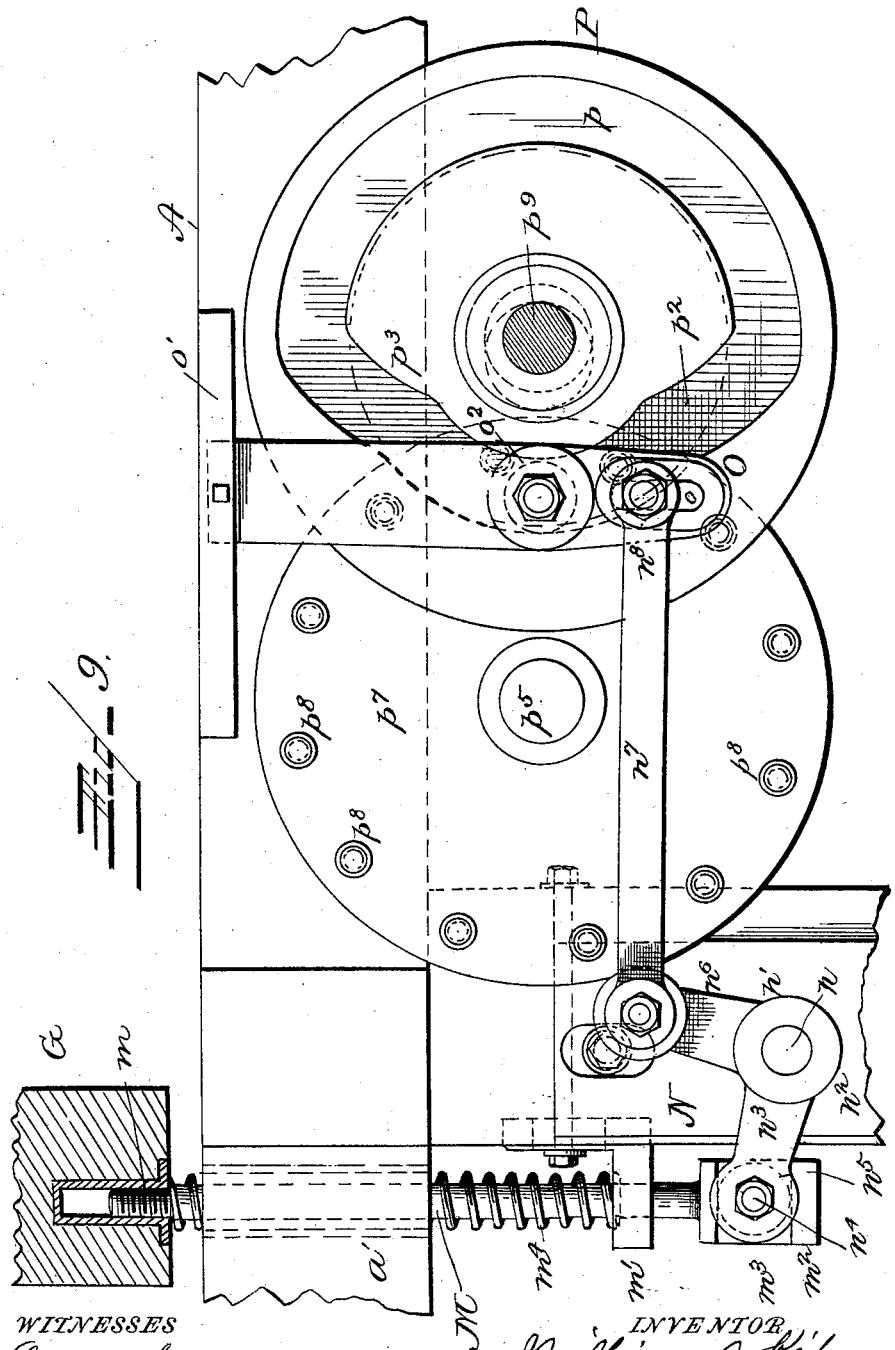
WITNESSES
INVENTOR

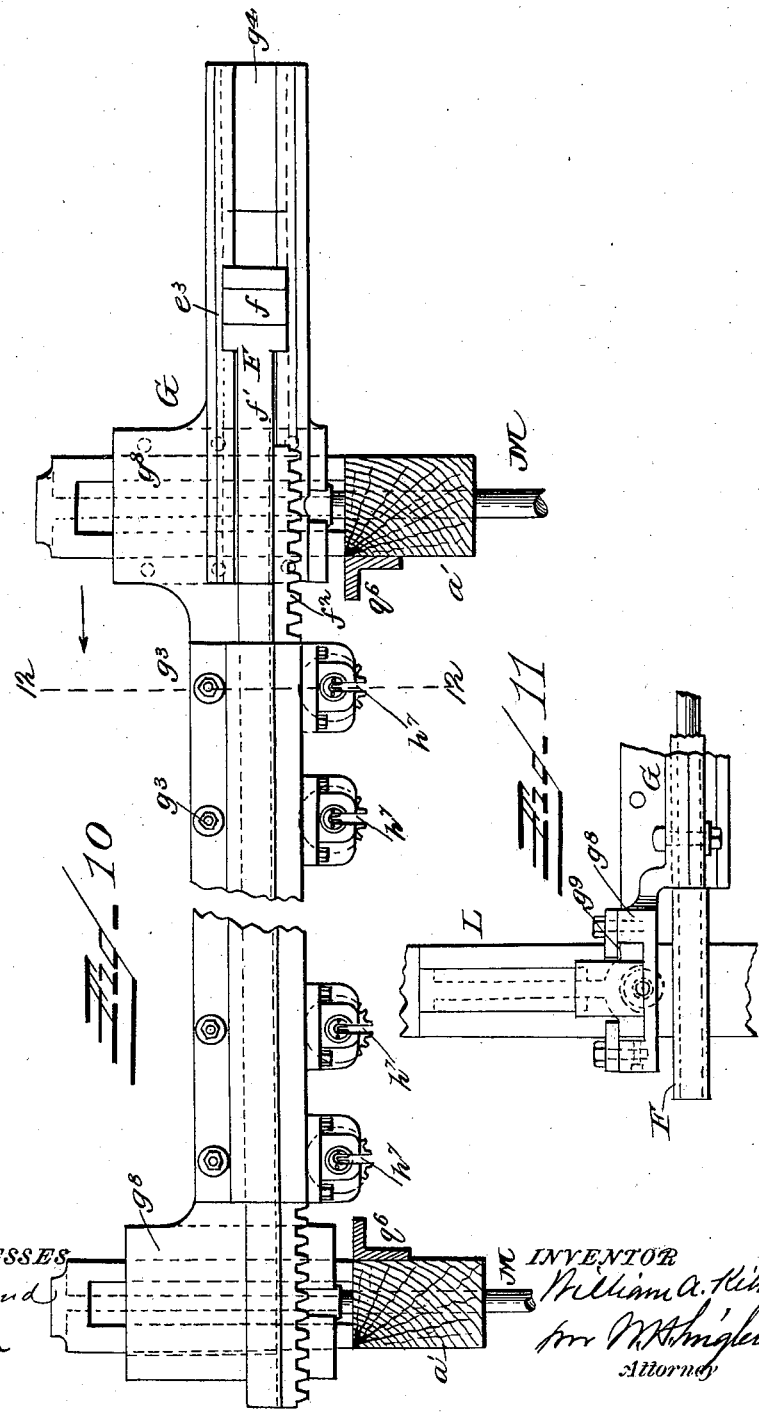

(No Model.) 9 Sheets—Sheet 9.
W. A. KILMER.
FENCE MACHINE.
No. 595,392. Patented Dec. 14, 1897.
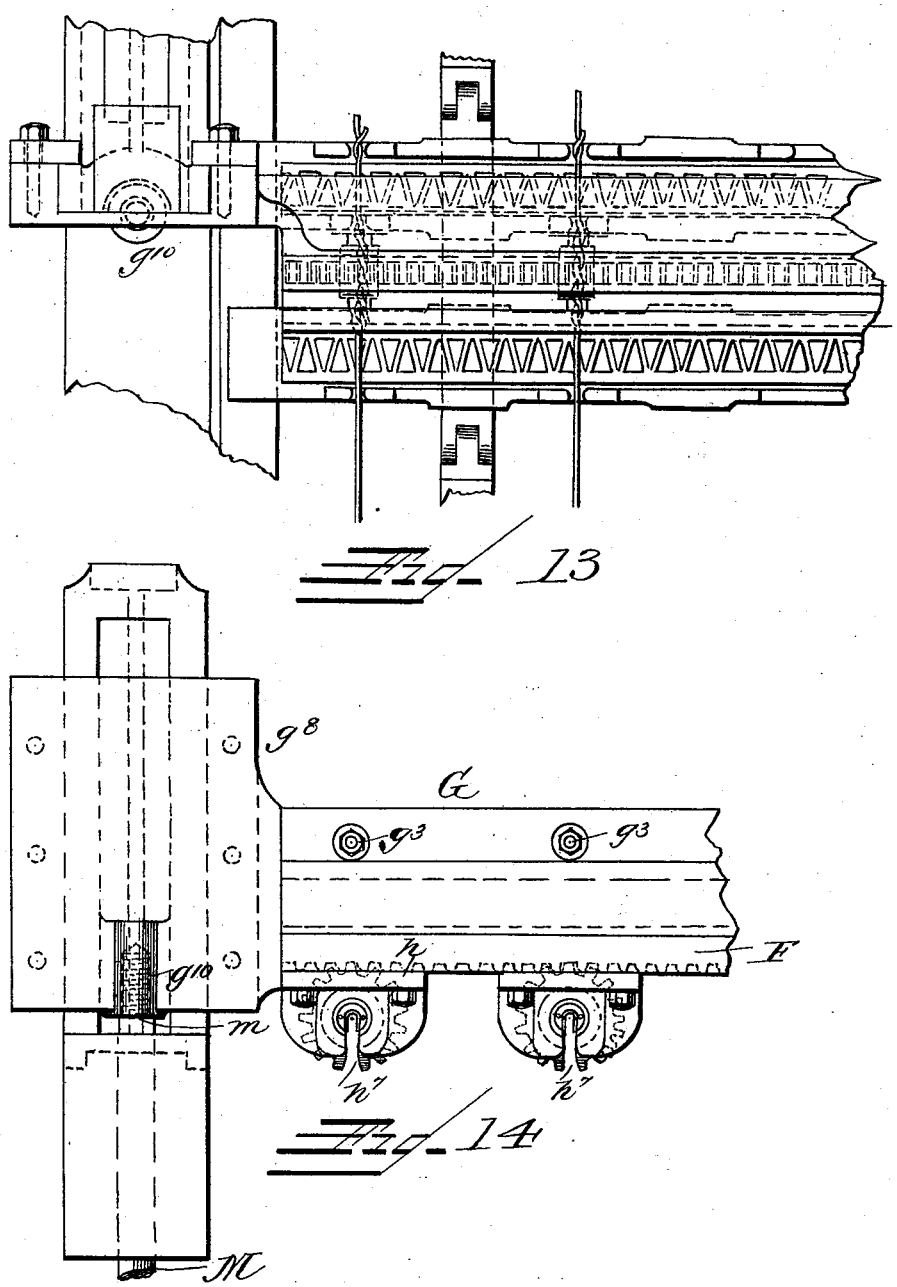
WITNESSES
F. L. Ourand
J. H. Kester
INVENTOR
William A. Kilmer
per W. H. Singleton
Attorney
THE NORRIS PETERS CO., PHOTO-LITHO., WASHINGTON, D. C.

UNITED STATES PATENT OFFICE.

WILLIAM A. KILMER, OF NEWBURG, NEW YORK, ASSIGNOR, BY MESNE ASSIGNMENTS, TO ERNEST L. CAMBURN, OF CHICAGO, ILLINOIS.

FENCE-MACHINE.

SPECIFICATION forming part of Letters Patent No. 595,392, dated December 14, 1897.

Application filed June 8, 1895. Serial No. 552,170. (No model.)

*To all whom it may concern:*

Be it known that I, WILLIAM A. KILMER, a citizen of the United States, residing at Newburg, in the county of Orange and State of New York, have invented certain new and useful Improvements in Machines for Making Fences; and I do hereby declare the following to be a full, clear, and exact description of the invention, such as will enable others skilled in the art to which it appertains to make and use the same.

This invention relates to an improvement in machines for making fences, more particularly to that class of machines which are used for making picket fence consisting of pickets held together by strands of twisted wire.

The invention consists in the construction hereinafter set forth.

Figure 1:
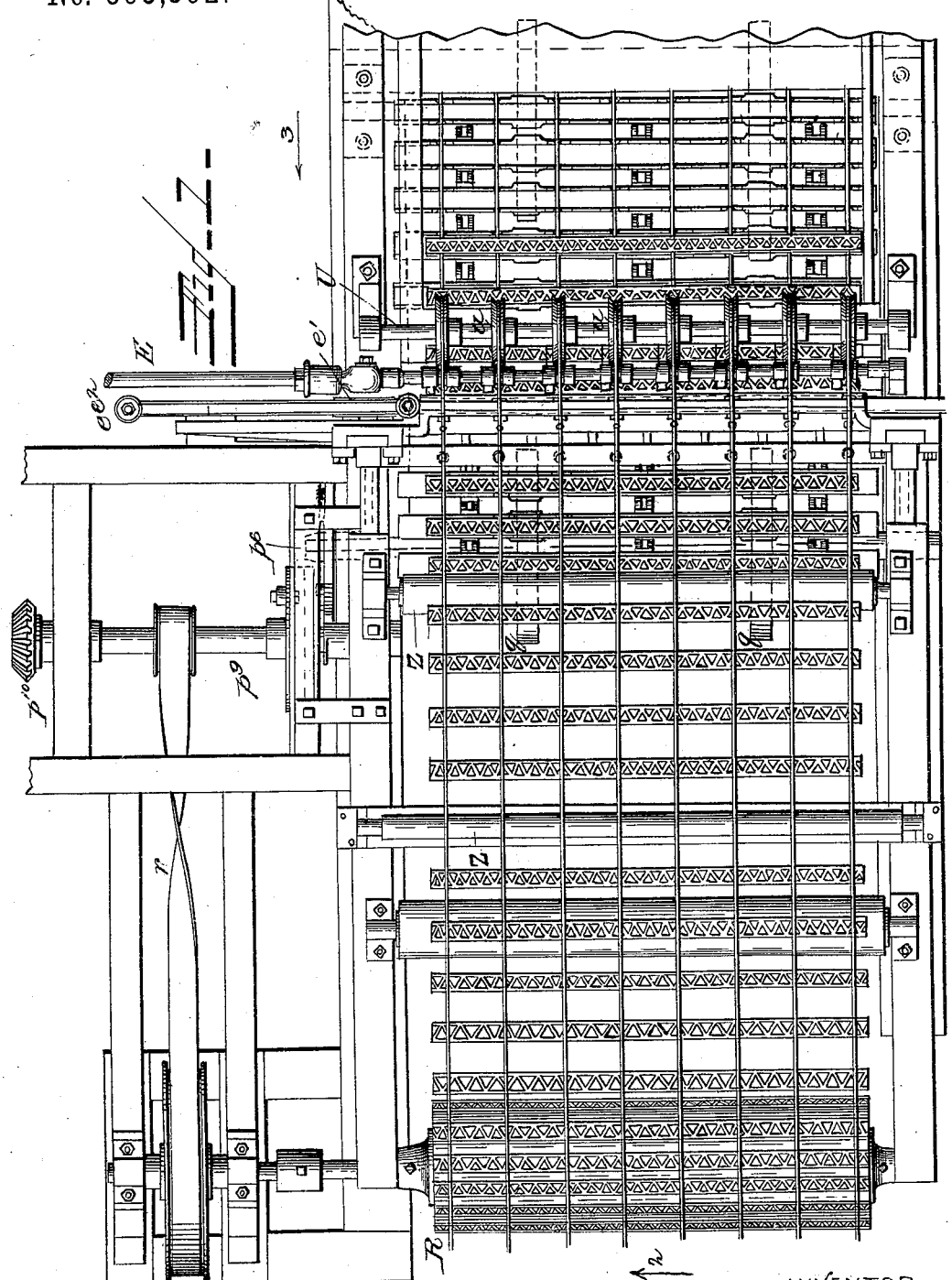
Figure 2:
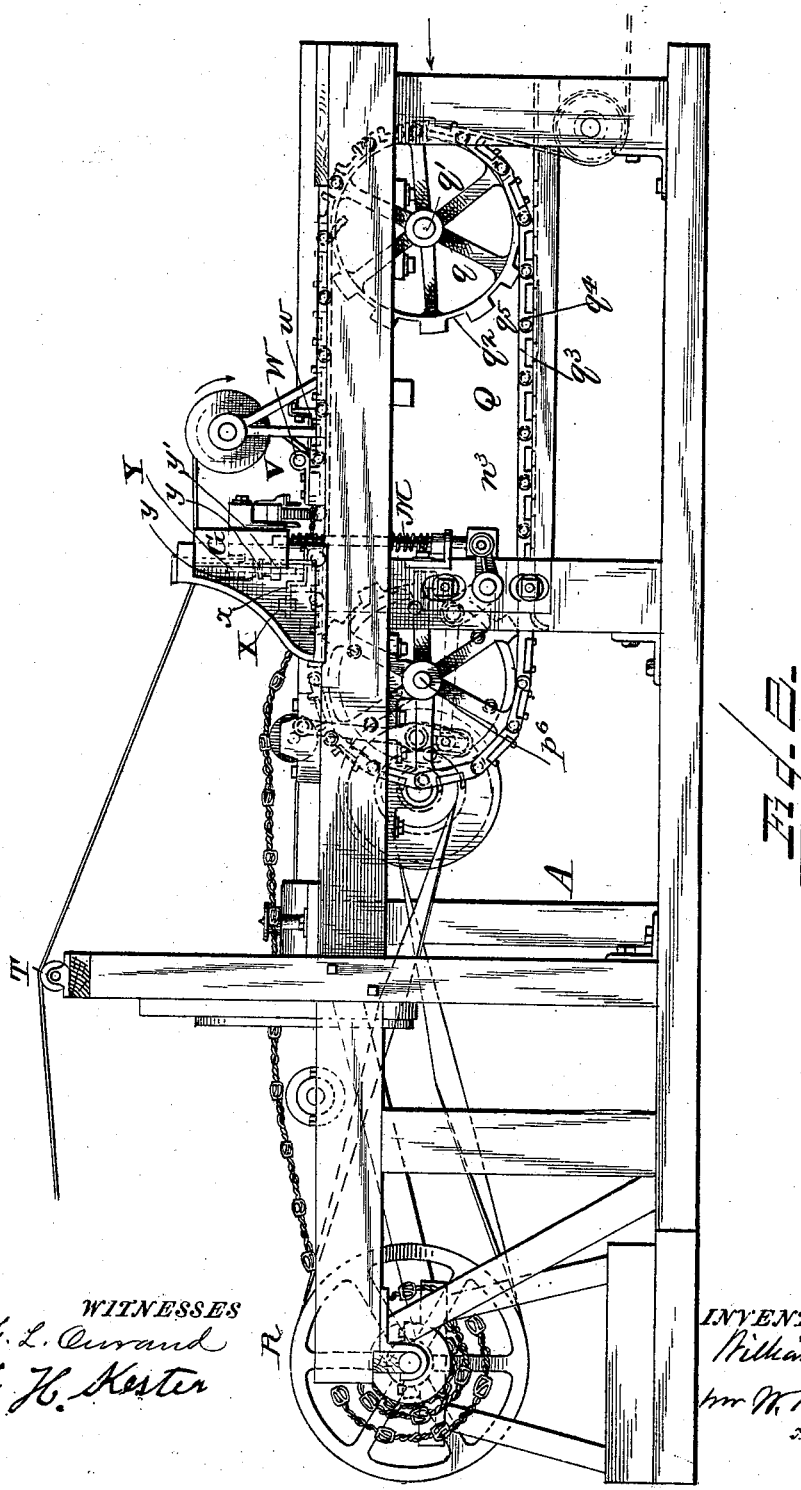

In the annexed drawings, Figure 1 represents a top view of the machine. Fig. 2 represents a side view of the machine, looking in the direction of the arrow 2. Fig. 3 is an end view of the device, looking in the direction of the arrow 3, Fig. 1. Figs. 4 and 5 represent plan views of gearing for driving the Pittman action of the rack-bar. Figs. 6 and 7 represent side and sectional views of the wheel clutch mechanism in this gearing. Fig. 8 represents a detailed top view of the cam-wheel and the connections for operating the cross-bar and conveyer. Fig. 9 represents an enlarged side view of the parts shown in Fig. 8. Fig. 10 represents a section taken through the machine in front of the cross-bar and rack-bar, showing these in elevation. Fig. 11 represents a detailed top view of one end of the cross-bar and rack-bar. Fig. 12 represents an enlarged detailed transverse section taken on line 12 12, Fig. 10. Fig. 13 represents a detailed top view of the portion of the machine looking down upon the cross-bar. Fig. 14 represents an enlarged detailed view showing in elevation one end of the cross-bar, rack-bar, and two twisters.

In the drawings, the letter A represents a suitable frame for carrying the mechanism of the machine. At one side in suitable boxing is placed the main driving-shaft $A'$, to the wheel $A^2$ of which power is conveyed by a suitable belt. Parallel to the shaft $A'$ and in suitable bearings on the frame A is placed a shaft B. On this shaft is placed the friction-wheel $b$. Upon the shaft $A'$ is a pinion $a$, which meshes with the large gear-wheel $b'$, which is loose upon the shaft B. To one side of this wheel $b'$ there is secured to the shaft B by its hub $c$ the bar C, having two arms $c'$ extending opposite to each other radially from the hub $c$. This bar C may be hollowed out for lightness. At each end this bar C is made with the recess $c^2$ and in such recess is placed a toe $c^3$. Projecting into the bottom of the recess $c^2$ is an adjusting-screw $c^4$, by means of which the toe $c^3$ may be adjusted in such recess $c^2$. The toe $c^3$ has a threaded hole $c^5$, into which takes the threaded end $c^6$ of bolt $c^7$, which extends through the slot $c^8$ in the end $c'$ of the bar C. By means of the screws $c^4$ and $c^7$ the toe $c^3$ may be suitably adjusted and held in place.

Near its periphery the wheel $b'$ is provided with a boss $b^2$, having the bore $b^3$. Placed loosely in this bore $b^3$ is the shaft $b^4$. To the projecting ends of this shaft $b^4$ there is secured by suitable set-screws the clutch $b^5$, on the side of the wheel $b'$ toward the bar C, and the trip-arm $b^6$ to the opposite side of the wheel $b'$. The clutch-arm $b^5$ is so arranged that the toe $c^3$ is in the path of this clutch $b^5$ when the wheel $b'$ is rotated, and secured to the end of the frame $a'$ is a tripper $b^7$, which is in the path of the trip-arm $b^6$ when the wheel $b'$ is rotated. The ends of the toe $c^3$ and the clutch $b^5$, the trip-arm $b^6$, and the tripper $b^7$ may be suitably beveled, so as to allow them to readily pass one another.

To the trip-arm $b^6$ a spring $b^8$ is secured at one end, the other end of this spring being suitably secured to the wheel $b'$, such spring being secured to the trip-arm $b^6$, so as to throw the clutch $b^5$ back into position after the tripper $b^7$ has thrown it away from the toe $c^3$. The tripper $b^7$ may be made adjustable vertically, so as to regulate the time of tripping the clutch.

To the projecting end $b^9$ of the shaft B is secured the crank-arm D. In one end $d$ of this crank-arm D is made a socket $d^2$. In this socket $d^2$ is placed the end of the pin $e$ of the connecting-rod E. The end of this pin $e$ in the socket $d^2$ is held by an adjusting-screw $d^3$, so that the connecting-rod may be adjusted upon the crank D. At its other end this connecting-rod E is pivoted to the cross-head $e'$, which is adapted to slide in the guide $e^2$. This cross-head $e'$ is provided, on the side away from the connecting-rod E, with a vertical slide-bar $e^3$, which engages and slides in a vertical groove $f$ of the rack-bar F. This rack-bar may for convenience be made in sections and secured together, the teeth being on one section and secured to the other section of the rack-bar. This rack-bar is adapted to slide in the longitudinal way $g$ of the cross-bar G. This cross-bar G is made in two pieces $g'$ and $g^2$, held together at the top by the bolts $g^3$, the meeting parts being let one into another for convenience of fit. The two parts $g'$ and $g^2$ of this cross-bar G are made with the grooves $g^4$ and $g^5$, such grooves combining to form the way $g$.

At the end of the cross-bar G toward the cross-head $e'$ the groove $g^4$ extends outwardly and is open to one side, so that the way $g$ is continued out beyond the closed portion of the cross-bar G.

The end of the rack-bar F in which is the vertical groove $f$ is made enlarged and on the rear side fits into the open portion of the groove $g^4$. In the way $g$ of the cross-bar G fits the top or larger portion $f'$ of the rack-bar F. The lower portion of the rack-bar F— that is, the portion having the teeth $f^2$—is made somewhat smaller than the top portion $f'$ and projects downwardly into the longitudinal passage $g^6$ of the cross-bar, such passage being less in width than the width of the way $g$. The teeth $f^2$ project down into this passage $g^6$ almost or quite to the lower edge of the cross-bar G.

At stated intervals, determined by the number of strands which the fence is to have, there are securely bolted to the under side of the cross-bar G the pairs of brackets $h$, there being a space $h'$ between the two brackets of each pair. These brackets may have a shoulder $h^2$, which takes into the recess $g^7$ of the cross-bar G; also, these brackets have inward projections $h^3$, so that the space $h'$ between the brackets is less in width than the passage $g^6$, there being rabbets $h^4$ in such brackets. Each bracket has depending from it a bearing $h^5$, such bearing being spaced to a pillow, as at $h^6$, the space $h^6$ being of the same size and alined with the space $h'$ at the top of the bracket. These bearings $h^5$ are made circularly hollow on the inside and have at the bottom the slot $h^7$. In the hollows of the bearing $h^5$ are placed the gudgeons $k$ of the twister K. This twister K is a wheel having the teeth $k'$. This twister K is made so that just inside of the teeth $k'$ there is a portion which fits the spaces $h'$ and $h^6$ in the brackets, the teeth being enlarged beyond these spaces.

The twister K is made with its gudgeons $k$ hollow, and it also has a slot $k^2$ opening out of these hollows. This twister is so placed in the brackets that its teeth $k'$ mesh with the teeth $f^2$ of the rack-bar F.

Just above the timbers $a'$ of the machine-frame cross-bar G is the vertical enlargement $g^8$, which is provided at the rear side with the ways $g^9$, which engage the guide-posts L. On the under side at its end and below the enlargements $g$ and $h$ the cross-bar G is provided with thimbles $g^{10}$. In these thimbles are secured the upper ends $m$ of the rods M. These rods M pass down through bores in the timbers $a'$ and also through brackets $m'$, secured to the timbers of the machine, and at their lower ends $m^2$ have at one side the grooves $m^3$, such ends $m^2$ being enlarged. Encircling the rods M are springs $m^4$, these springs passing through the bore in the timbers $a'$ and being between the cross-bar G and the brackets $m'$. If desired, the bracket $m'$ may be made adjustable upon the timber.

Secured adjustably to the outside of the timber to which the bracket $m'$ is fastened is a plate N. Passing transversely through the machine is a rock-shaft $n$, one end of which passes through the plate N and the other end through the opposite side of the machine. On the end of this rock-shaft projecting beyond the plate N is the hub $n'$ of the bell-crank lever $n^2$. The outer end $n^3$ of this crank $n^2$ is pivoted by a bolt $n^4$ to the lower end of the rod M, there being a circular boss $n^5$, which fits in the groove $m^3$. To the other end of the rock-shaft $n$ is secured an arm $n^3$, similar in construction, the screw of which engages the lower end of the rod M at that side of the machine.

The arm $n^6$ of the bell-crank lever $n^2$ is pivoted at its outer end to the connecting-bar $n^7$, which is held at its end $n^8$ in the guide-slot $o$ of the cam-lever O. At its other end $o'$ this cam-lever O is adjustably held to the frame A and is provided with a cam-pin $o^2$, provided with a friction-roller which fits into the cam-slot $p$ of the cam-wheel P. The cam-groove $p$ is provided with the portion $p^2$ for the upstroke of the rod M and the portion $p^3$ for the downstroke of this rod. To the opposite face of this cam-wheel P is secured a stud $p^4$. On the projecting end $p^5$ of the conveyer-shaft $p^6$ is a wheel $p^7$, having a number of studs $p^8$, such studs being in the path of the stud $p^4$. The cam-wheel P is placed upon a shaft $p^9$, which has at its outer end the bevel-wheel $p^{10}$, engaging the bevel $p^{11}$ on shaft $p^{12}$, which has a gear-wheel $p^{13}$, meshing with the pinion $a^2$ at the end of the shaft A' away from the power-wheel $A^2$.

To the shaft $p^6$ are secured the conveyer-wheels $q$ of the conveyer Q. At the other end of the machine there is another similar pair of conveyer-wheels $q$, which are secured to the shaft $q'$. These wheels are all constructed alike. They have in their periphery the recesses $q^2$, so that such wheels are similar to sprocket-wheels. Engaging these recesses $q^2$ of the wheels $q$ are the picket-conveyer cross-bars $q^3$, which, as shown in the drawings, are arranged as an endless chain around the wheels $q$. These picket-conveyer cross-bars are made of a size and shape to fit into the recesses $q^2$. They are made trough shape, having vertical sides $q^4$ and the bottoms $q^5$. In the sides $q^4$ of these picket-conveyer cross-bars are made suitable notches to permit of the passage of the wires for forming the twisted strands. The ends of these picket-conveyer cross-bars come on top of the angle-iron guides $q^6$, (see Fig. 10,) which hold the conveyer from sagging on the top side.

At the rear end of the machine is placed the reel R, about which the completed fencing is wound, this reel being driven by a belt $r$ from the shaft $p^9$. This reel is not driven continuously during the operation of the machine, but there is just sufficient friction between the belt and the wheel at the end of the shaft carrying the reel to take up the material as it is made by the machine and not enough to run the reel continuously, there being sufficient slip to prevent the reel from being run continuously.

At the front end of the machine near the bottom there is placed a shaft S, on which are grooved wheels $s$. Around these wheels is passed the wire which forms part of the twisted strands, this wire passing on the conveyer and the pickets being laid upon it.

To the rear end of the cross-bar G there is secured above the machine a roller T, over which the top wire is passed, and to the front of the cross-bar G is placed a shaft U, having grooved rollers $u$, over which these picket-wires pass. Back of and between the shaft U and the cross-bar G is placed a transverse shaft V close to the top of the frame of the machine. On this shaft V at the place where the top wires pass under the shaft this shaft is made with enlargements $v$, having the grooves $v'$ for these wires. Just in front of this shaft V there is a transverse cross-bar W, from which there extend rearwardly fingers $w$ for holding the material down on the conveyer, and back of the cross-bar G there is a slide-bar X, having similar fingers, there being a space between the two sets of fingers $w$ where the twist is formed.

The cross-bar G is made on its rear side with the flanges $y$, through which flanges pass suitable plungers Y, surrounded by springs $y$ between the flanges. Placed just above and a little to the rear of the conveyer-wheels $q$ is a round stripper Z.

When power is applied to the shaft A', the wheel $b'$ is turned around the shaft B until the clutch $b^5$ comes in contact with the toe $c^3$. When this occurs, a further rotation of the wheel $b'$ causes the bar C to rotate. This turns the shaft B on the crank-arm D. This rotation continues until the trip-arm $b^6$ strikes against the tripper $b^7$. As soon as this occurs the clutch $b^5$ is released from the toe $c^3$, and while the wheel $b'$ continues to rotate the shaft B ceases rotating until the clutch $b^5$ engages the second toe $c^3$. The arrangement of the trip-lever $b^6$ to the tripper $b^7$ is such that the shaft B will be given a little more than a half-turn for each engagement of the clutch $b^5$ with the toe $c^3$, for a reason which will be hereinafter explained. As the crank-arm D makes its movement through the connecting-rod E and cross-head $e'$ the rack-bar F is driven in one direction, and as this occurs the twisters K are given several rotations.

The pieces of metal which are to form the pickets are placed in the picket-conveyer cross-bars on the conveyer, with one wire above and one below. These two wires are passed through the openings in the brackets $h$ and twisters K up within the said twisters. As the rack-bar F causes the twisters K to rotate they give these two wires a right and left hand twist, as is clearly shown in Fig. 12. It is obvious that as these wires are twisted by the twister K when the rack-bar F would come to the end of a throw the said wires would be held tightly or be bound in said twisters; but by reason of the fact that the shaft B is given a little more than a half-turn, as already stated, the connecting-rod E is given a slight movement backward from its stroke, which causes the rack-bar F to give each twister a little of a back throw, say about a quarter of a revolution. This releases the strain of the twister upon the wire, so that the twister may be readily disengaged from the wire.

By a proper adjustment of parts while the rack-bar F is being driven forward or backward, so as to operate the twisters K, the cam-pin $o^2$ of the cam-lever O is in the circular portion of the cam-slot $p$, so that there is no movement of the cross-bar G; but as soon as the twister has performed its function and the fence is ready to be moved forward the cam-pin $o^2$ comes to the portion $p^2$ of the cam-slot $p$, and through the connections $n^7$ and $n^2$ and rod M the cross-bar G is lifted, carrying with it the rack-bar F and the twisters K, the connection between the slide-bar $e^3$ and the vertical groove $f$ permitting this movement. When the cam-pin $o^2$ reaches the portion $p^3$ of the cam-slot $p$, the cross-bar G is caused to descend; but in the meantime one picket has passed on, and that portion of the wires back of this picket is then received up into the twisters and ready for the next stroke of the rack-bar. As the cross-bar G comes down the plungers Y are forced down upon the top wires where they cross the pickets and force the two into intimate relation and also hold the two firmly together, when the twister is released from the wires by the slight back stroke already spoken of. As the cam-wheel P rotates this rotation is so timed that the pin $p^4$ will come in contact with one of the pins $p^7$ when the picket has been formed in the fence and the fence is ready for a forward movement. This contact of the pin $p^4$ with the pin $p^7$ causes the conveyer to be moved forward one picket.

Having described my invention, what I claim is—

1. The combination of the shaft A' and its pinion $a$; the shaft B and its bar C; the gear-wheel $b'$ engaging the pinion $a$, loose on the shaft B and provided with a clutch and trip-arm; and the tripper $b^7$, as set forth.

2. The combination of the shaft B; the crank-arm D; the connecting-rod E secured to such crank-arm at one end; the cross-head secured to the connecting-rod at the other end; the rack-bar F engaging such cross-head; the cross-bar G, and the twisters K; the twisters being journaled in the cross-bar G, and the rack-bar F being in the cross-bar G and engaging said twisters, as set forth.

3. The combination of the guide-post L; the cross-bar G; the rods M; the rock-shaft $n$; the crank-arms at each end of such rock-shaft and engaging the lower ends of the rods M; the cam-wheel P, and the connections between such wheel and one of the crank-arms, as set forth.

4. In the fence-machine shown and described, the combination of the endless picket-conveyer and its cross-bars and wire-guides, the means for driving said conveyer, the twisters, the rack-bar for operating said twisters, and the means for reciprocating said rack-bar, the transverse bar for carrying said rack-bar and twisters, the means for vertically reciprocating said transverse bar with said rack-bar and twisters, and the means for conducting the fence-wires through the machine, all arranged to operate substantially as and for the purpose set forth.

5. In the fence-machine shown and described, the combination of the endless picket-conveyer, the vertically-reciprocating cross-bar arranged above and across said endless conveyer, the series of twisters journaled in said cross-bar, the reciprocating rack-bar arranged in said cross-bar and in mesh with said twisters, and the means for operating said parts, and for conducting the fence-wires through the machine, all arranged to operate substantially as and for the purpose set forth.

6. In the fence-machine shown and described, the combination of the rack-bar, the twisters, and the mechanism for turning the twisters slightly backward after a full throw of the rack-bar to release the twisters from the twisted strand-wires so the twisters may be easily removed from contact therewith, substantially as and for the purpose set forth.

In testimony whereof I affix my signature in presence of two witnesses.

WILLIAM A. KILMER.

Witnesses:
LE MAR KILMER,
C. A. MCCREADY.